United States Patent [19]

Watkins

[11] 4,008,379
[45] Feb. 15, 1977

[54] TOUCH-PAD TO DIAL CONVERSION UNIT

[75] Inventor: Arthur Gene Watkins, Santa Ana, Calif.

[73] Assignee: San/Bar Corporation, Santa Ana, Calif.

[22] Filed: Feb. 14, 1975

[21] Appl. No.: 550,008

[52] U.S. Cl. .......................... 179/90 K; 179/16 EC
[51] Int. Cl.² .......................................... H04M 1/31
[58] Field of Search .......... 179/90 K, 90 D, 16 EC, 179/18 DA, 90 R, 16 AA

[56] References Cited

UNITED STATES PATENTS

| | | | |
|---|---|---|---|
| 3,553,382 | 1/1971 | Knox et al. | 179/18 DA |
| 3,569,634 | 3/1971 | Amadasi et al. | 179/18 DA |
| 3,727,007 | 4/1973 | Catlin | 179/18 DA |
| 3,757,055 | 9/1973 | McCann et al. | 179/90 D |
| 3,786,496 | 1/1974 | Verbaas | 179/90 K |
| 3,787,639 | 1/1974 | Battrick | 179/90 K |
| 3,856,982 | 12/1974 | Lawson et al. | 179/90 K |
| 3,881,070 | 4/1975 | McCabe et al. | 179/90 K |
| 3,956,596 | 5/1976 | Connolly et al. | 179/90 K |
| 3,969,592 | 7/1976 | Pipitone et al. | 179/90 R |
| 3,973,084 | 8/1976 | Hovland | 179/90 K |

OTHER PUBLICATIONS

Norelco Prestafone Technical Bulletin, North American Philips Corporation, received Apr. 30, 1973.

Primary Examiner—Kathleen H. Claffy
Assistant Examiner—Randall P. Myers
Attorney, Agent, or Firm—Jackson & Jones Law Corporation

[57] ABSTRACT

In areas utilizing telephone switching equipment that will only accept dial pulses, a conversion unit, that fits into the space formerly occupied by the dialing mechanism in a standard telephone subscriber's unit, provides touch-pad dialing. The conversion unit accepts input signals, representing digits, from a standard 3 × 4 matrix touch-pad at an asynchronous rate and starts out-pulsing at the required pulse repetition rate as soon as the first digit signal is received. During each touch-pad button depression, an audio tone is supplied to the subscriber unit earpiece. The conversion unit provides for programmable toll restriction that permits selective prohibition of out-pulsing at each subscriber unit. At the instant a restricted input signal is received, the conversion unit provides a steady audio tone to the earpiece and stops out-pulsing. To prevent hookswitch dialing, the conversion unit extends the break period of the electronic pulsing switch. The entire conversion unit is powered by the DC voltage on the C.O. line with negligible transmission attenuation.

11 Claims, 5 Drawing Figures

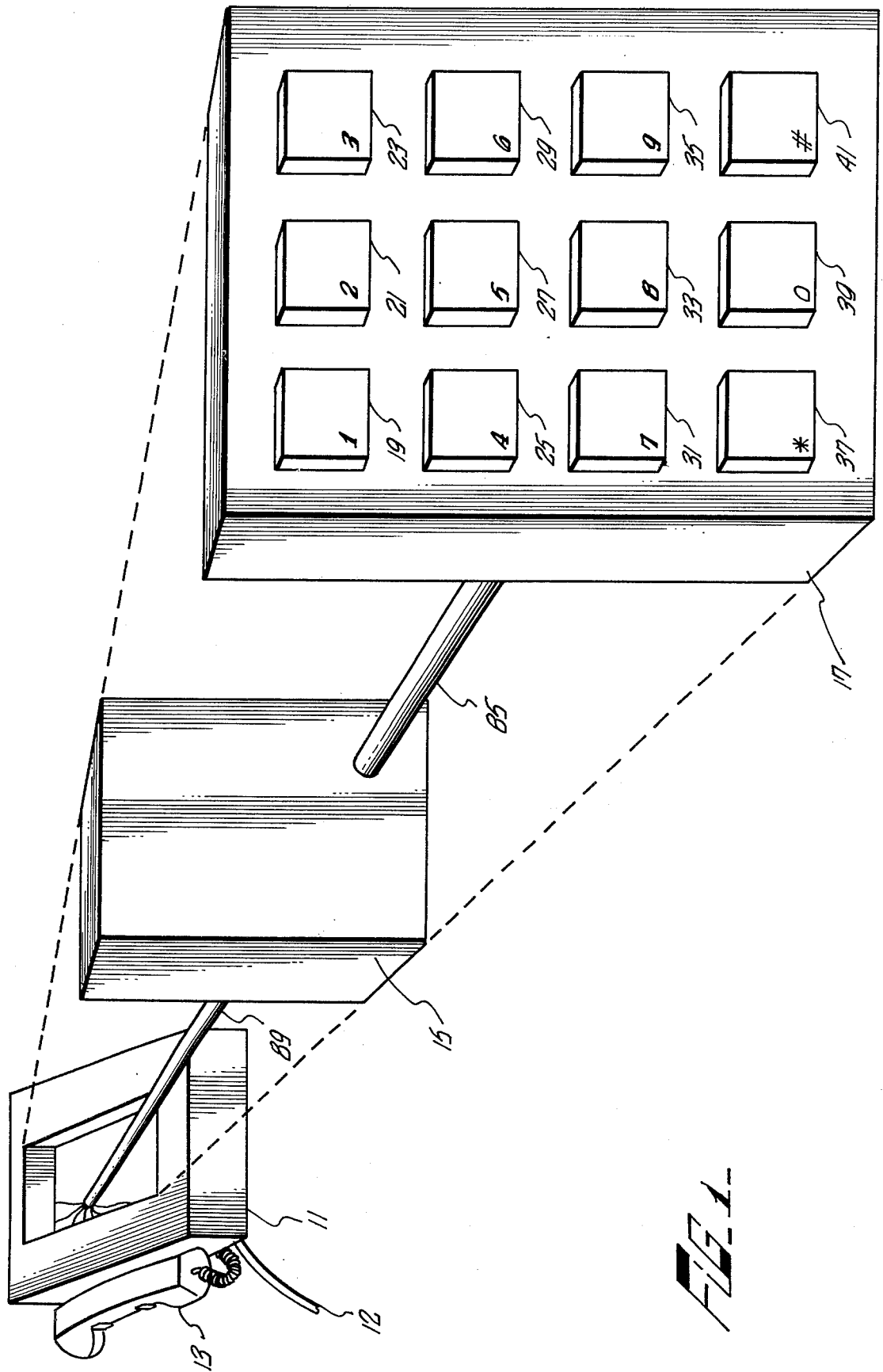

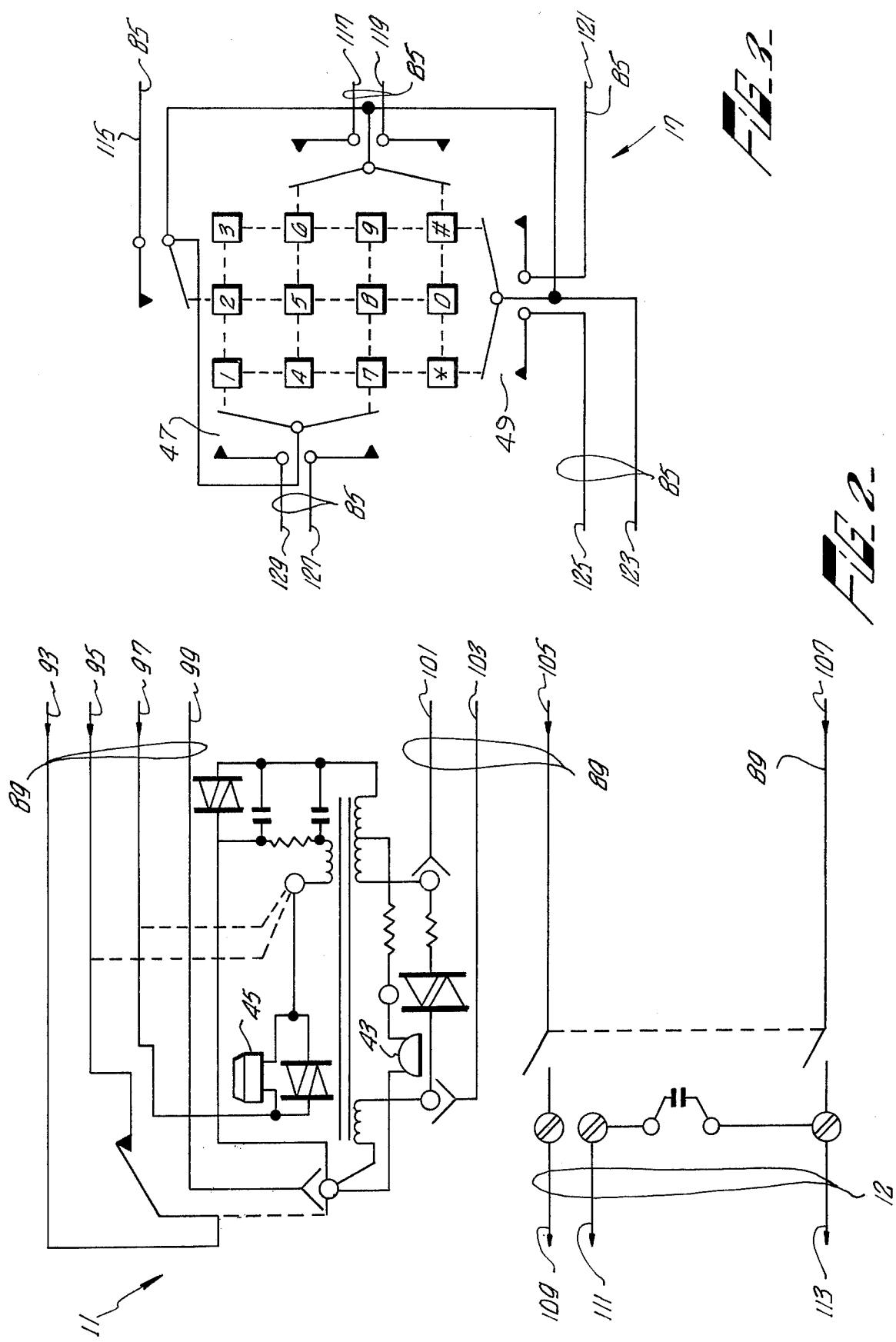

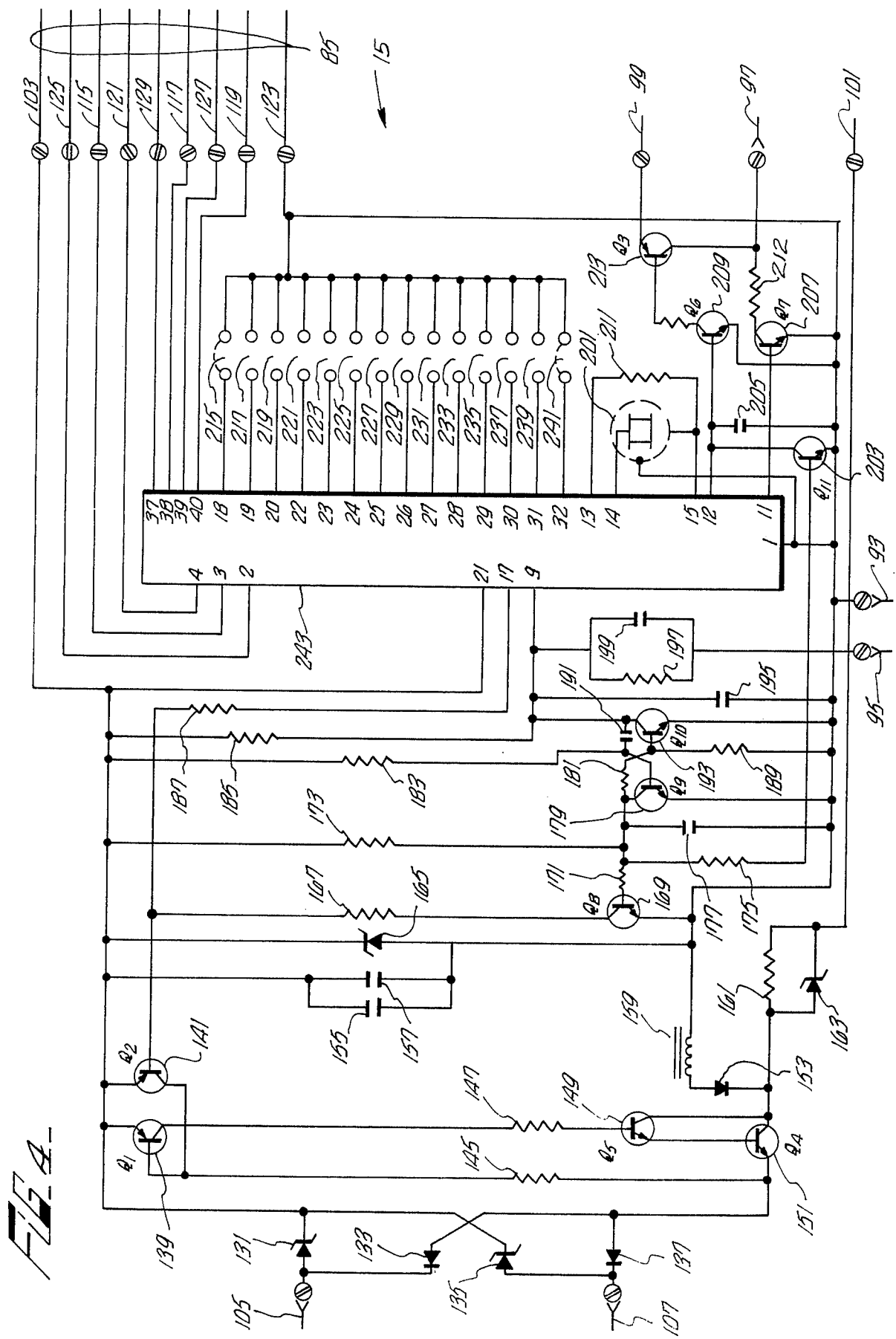

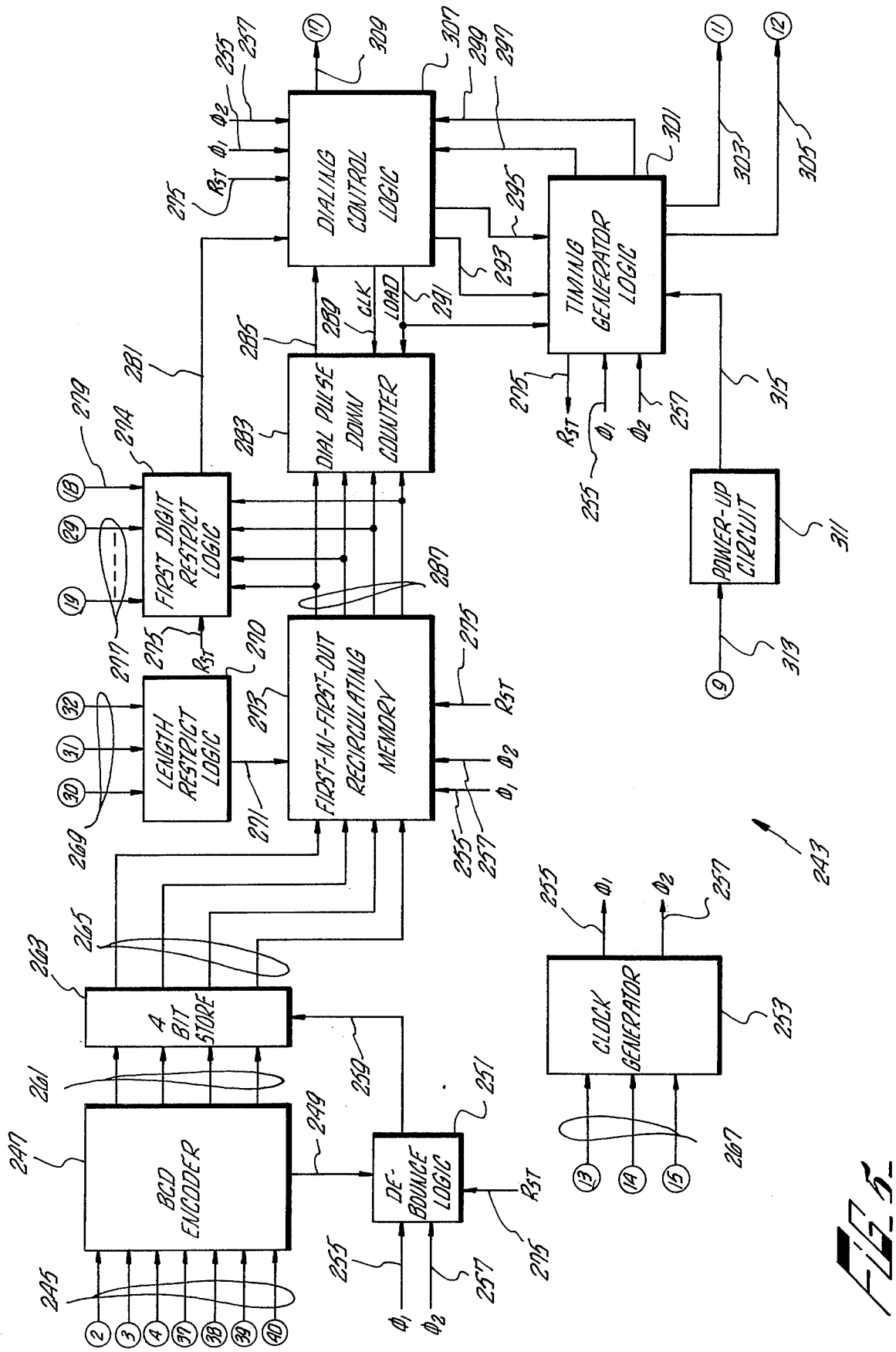

TOUCH-PAD TO DIAL CONVERSION UNIT

BACKGROUND OF THE INVENTION

The present invention relates generally to improvements in touch-pad to dial pulse conversion units, and more particularly pertains to new and improved touch-pad to dial pulse conversion units for installation within a subscriber unit wherein the conversion unit can receive the touch-pad input signals at an asynchronous rate, the entire conversion unit being powered from the current on the tip and ring lines.

In the field of touch-pad to dial pulse conversion, it has been the practice to employ separately housed and separately powered logic circuitry for performing the function of converting touch-pad input signal to dial pulses that are recognizable by a central office switching network. The bulkiness of these units and the necessity for using a separate power source, such as batteries to power the conversion circuits, have detracted from the attractiveness of such a device. Attempts have been made to design a conversion circuit that can be incorporated into the subscriber station and also be powered from the central office line current. These attempts, so far as is known, have resulted in considerably decreased performance of the subscriber unit. As a consequence, such attempts have reverted back to the use of a back-up power source, for example, a rechargeable nickle cadmium type battery.

Besides the function of converting touch-pad signals to central office recognizible pulse trains,, the present invention provides for toll restriction at the subscriber unit that can be preset and reset according to the restriction parameters desired. Prior art toll restriction units usually function somewhere in the tip and ring circuit between a central office and a subscriber unit. This requires the toll restrictor circuitry to be housed in a container separate from the subscriber unit, thereby creating access and mounting problems.

OBJECTS AND SUMMARY OF THE INVENTION

An object of this invention is to provide a touch-pad to dial-pulse converter that receives asynchronous touch-pad generated signals and starts generating the appropriate pulses upon reception of the first touch-pad signal.

Another object of this invention is to provide a touch-pad to dial-pulse converter that fits within the space in the subscriber unit that the dial mechanism occupied.

A further object of this invention is to provide a touch-pad to dial-pulse converter that is only powered from the central office battery, and does not impair voice transmission.

Yet another object of this invention is to provide a touch-pad to dial-pulse converter that permits selective prohibition of out-pulsing of certain digit combinations and certain digit lengths.

Still a further object of this invention is to provide a touch-pad to dial pulse converter that prevents hookswitch dialing.

These objects and the general purpose of the invention are accomplished as follows. By use of integrated circuit technology, the memory and logic required for the generation of selected pulses and their selective inhibition, when restricted, can be produced in a very compact form. Power to drive such logic circuitry is supplied by a charge stored on a capacitor. The capacitor is charged with a small portion of the line current, in order to prevent pulse voice attenuation. The punched (rather than dialed) pulses are generated by a transistor relay that responds to logic circuitry generated pulses, such logic circuits, in turn being responsive to the signals read out of a memory. Number length restrictive logic prevents the memory from being loaded with more digits than permitted by the logic. First and second digit restrictive logic tests the first and second digit out of the memory for the selected prohibitive digits. A circuit responds to hookswitch actuation to extend the break period in order to confuse a hookswitch dialing attempt without preventing flash-back to a PBX console.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 is an exploded perspective of a touch-pad dialer subscriber unit utilizing the present invention.

FIG. 2 is a schematic diagram of a standard Western Electric telephone instrument.

FIG. 3 is a schematic diagram of a standard two contact closure touch-pad keyboard.

FIG. 4 is a schematic of the touch-pad to dial pulse conversion unit of the present invention.

FIG. 5 is a block diagram of the dial pulse generator utilized by the conversion unit of FIG. 4.

DESCRIPTION OF THE PREFERRED EMBODIMENTS:

The touch pad to dial pulse conversion unit 15 of the present invention is sufficiently compact to be able to be mounted entirely within a subscriber unit 11. The conversion unit 15 receives touch-pad signals over lines 85 from a standard 3 × 4 touch-pad matrix 17 having 12 buttons thereon, 19 – 41, each button representing a respective number 1 – 0. Button 37 represents an asterik. Button 41 represents a number symbol. The conversion unit 15 receives the signals from the touch-pad 17, converts them to dial pulses untilizable by a central office switching system, and transmits these pulses over cables 89 to the tip and ring circuitry in the subscriber unit 11. The subscriber unit 11 is a standard Western Electric or ITT subscriber unit. The present invention can work equally well with a key subscriber unit or a non-key single line unit. Each unit must, however, be connected, by way of a cable 12, to a central office line and have a hand set, such as 13, containing a microphone and speaker therein which usually rests on a hookswitch mechanism.

FIG. 2 illustrates the subscriber unit 11 of FIG. 1 schematically with a speaker 45 and a microphone 43 inserted into the circuitry as shown. The cable 12 to the central office contains lines 109, 111 and 113. Line 109 is the tip line. Line 113 is the ring line. Line 111 is the ringer line. Cable 89 from the subscriber unit 11 to the conversion unit 15, of the present invention consists of 8 individual lines, 93, 95, 97, 99, 101, 103, 105, 107, that are connected to the conversion unit 15.

Reference is now made to FIG. 3 which schematically illustrates a 2 contact closure 3 × 4 matrix touch-pad keyboard. The cable 85 from the touch-pad keyboard 17 to the conversion unit 15 consists of 8 lines, 115, 117, 119, 121, 123, 125, 127 and 129. Upon the depression of any one of the buttons in the 3 ×4 matrix of the keyboard, the switches therein are actuated in a manner to cause the placement of a ground potential on a certain 2 of the above-named output lines. Thus, for example, the depression of the button designated as 1 will cause the closure of contacts 47 and the closure of contacts 49, thereby placing a ground level signal from line 123 on output lines 125 and 129. This particular touch-pad signal, thereby represents the digit 1 to the conversion unit 15.

The following table illustrates the switch closures that occur for the depression of the buttons 1 – 0. In the "Touch-Pad" column, the relationship between the various combinations of ground level output leads and button depressions is shown. The binary code (BCD) column illustrates the binary code generated by the conversion unit 15 in response to the reception of the various ground combinations from the touch pad 17. The "No. of Pulses" column indicates the number of output dial pulses generated by the conversion unit 15 in response to the generated BCD code.

TABLE

| | Touch-Pad | | BCD | No. of Pulses |
|---|---|---|---|---|
| | X | Y | | |
| 1 | 125 | 129 | 0000 | 1 |
| 2 | 115 | 129 | 0001 | 2 |
| 3 | 121 | 129 | 0011 | 3 |
| 4 | 125 | 117 | 0100 | 4 |
| 5 | 115 | 117 | 0101 | 5 |
| 6 | 121 | 117 | 0110 | 6 |
| 7 | 125 | 127 | 0111 | 7 |
| 8 | 115 | 127 | 1000 | 8 |
| 9 | 121 | 127 | 1001 | 9 |
| 0 | 115 | 119 | 1010 | 10 |

It should be understood that the table only represents an example of the signal relationships between the touch-pad signals, the binary BCD code and the dial pulses generated.

Referring now to FIG. 5, an explanation of the structure and function of the dial pulse generator 243 of FIG. 4 will be given. The logic circuit of dial pulse generator 243 is preferably implemented in MOS integrated circuitry, such circuit taking the form shown in FIG. 5.

Lines 245 leading from terminals 2, 3, 4, 37, 38, 39 and 40 of the dial pulse generator 243 carry the 2 out of 7 code signal generated by the touch-pad keyboard 17 of FIG. 3. This code is supplied to a BCD encoder 247 which converts the 2 out of 7 code to a 4 bit binary code that is supplied over output lines 261 to a 4 bit store 263. The format of this binary coded decimal code may be that shown in the above table. At the time the touch-pad signals are received by the BCD encoder 247, a signal is supplied over line 249 to debounce logic 251. This logic will begin a 16 millisecond count as long as the signal on line 249 is present. Presence of a signal on line 249 is indicative of a key being depressed. At the termination of this 16 millisecond count, the debounce logic 251 generates a signal on line 259 which enables the 4 bit store 263 to present its contents over lines 265 to the first-in first-out recirculating memory 273.

The first-in first-out memory 273 is preferably a 4 bit wide 15 bit long memory that allows storage of fifteen, 4 bit words, each bit representing a digit. Prior to the storage of any 4 bit digits in the memory 273, that is, the writing of information from 4 bit store 263 into memory 273, the memory contains one binary zero word in the designated first storage position, and all binary 1 words in the remaining storage positions. As each 4 bit digit is written into the memory 273, the address logic automatically steps to the next sequential memory location. Subsequent to the first 4 bit digit being read into the memory 273 and perhaps subsequent to the second, depending upon the speed at which the digits are being punched out on the touch-pad keyboard, the first digit is read out of memory 273 over lines 287. As that first digit is read out of memory 273, an all binary one 4 bit digit is read back into the 273, the memory. The recirculating memory functions, primarily, to buffer the 4 bit digit from store 263 being punched in by the touch-pad at an asynchronous rate and the 4 bit digit read out of the memory 287 on lines 287 to the dial pulse down counter 283.

Length restrict logic 270 responds to a combination of signals received over lines 269 from terminals 30, 31 and 32 of the dial pulse generator circuit 243 to establish, effectively, the size of the recirculating memory 273. The length restrict logic 270 generates signals on lines 271 to the recirculating memory 273 that disables, in accordance with the signal combination on lines 269, a certain number of the last storage locations of the recirculating memory 273. This is accomplished, in a manner well known in the art, by biasing the read/write logic of the memory to skip a certain number of the available storage locations. Thus, for example, if a binary high is being received from terminals 31 and 32 and a binary low from terminal 30, the length restrict logic 270 causes signals to be generated on lines 271 that only permit 7 digits to be stored in the recirculating memory 273. This prevents the dial pulse generator from outpulsing more than a 7 digit number, in a manner that will be more fully explained hereinafter.

Each 4 bit digit read out of the memory 273 is supplied to a dial pulse down counter 283 at a rate determined by the two phase clock pulses on lines 255, 257 respectively. These clock pulses are generated by the clock generator 253. The dial pulse down counter is a 4 bit settable binary counter that is clocked down over line 289 from dialing control logic 307. The dialing control logic 307 causes the counter 283 to count down from its original set count. Whenever the dial pulse counter 283 contains anything but an all zero count, it generates a signal on line 285 indicating that it is still full. When an all zero count is reached, the signal on line 285 will indicate that the counter is empty.

As an example of the operation of down counter 283, assume that the binary signals on line 297 are 0111, representing the digit 7. This 4 bit binary combination at the dial pulse down counter 283 will set the dial pulse down counter to number 7, thereby requiring 7 clock pulses on line 289 from dialing control logic 307 to reduce it to its empty state.

The empty/full signal on line 285 from the down counter 283 causes dialing control logic 307 to generate a restrict signal on line 295, a certain time after the signal on line 285 from the down counter 283 indicates that the down counter is empty.

The restrict signal on line 295 to timing generator logic 301 causes a constant tone to be applied on line 303, leading to terminal 11 of the dial pulse generator in addition to stopping pulsing signals in lines 297 and 299 from being sent to the control logic 307. This tone, as will be seen later, is supplied to the microphone of the subscriber unit to indicate that the operator has exceeded the number of digits permitted at this particular subscriber unit. This tone is continually generated until the timing generator logic 301 is reset.

In addition to length restrict logic, the dial pulse generator 243 contains first digit restrict logic 274. The first digit restrict logic 274 receives input signals over a plurality of lines 277 that eminate from terminals 19 through 29. Selection of one or more of these lines to apply a signal to will cause first digit restrict logic 274 to inhibit certain first digits from being pulsed out. Thus for example, a signal on terminal 29 alone will prevent a 0 first digit from being pulsed out.

First digit restrict logic 274 comprises a binary comparitor that compares the 4 bit digit read out of the memory 273 on lines 287 with the digit represented by the signals on lines 277. The first digit restrict logic 274 is only responsive to signals on lines 287 for the first 2 digits. Thus, lines 277 from terminals 19 to 29 may prevent any combination of any signal first digit from being pulsed out. Line 279 from terminal 18 will prevent the outpulsing of a second digit 0 . After first and second digit comparisons are made by the restrict logic 274, it locks out any further comparisons until it is reset by a signal on line 275 from timing generator logic 301.

Upon a comparison occurring in restrict logic 274, it generates a signal on line 281, to dialing control logic 307, instructing dialing control logic 307 to generate a restrict signal on line 295 to timing generator logic 301. Timing generator logic 301 responds to a restrict signal on line 295, as already noted, by applying a tone, such as a 1 KHz signal, on line 303 to terminal 11, and preventing any further pulsing signals on lines 297 and 299 from being sent to the control logic 307.

The timing generator logic 301 includes a counter that provides counts representing 1 millisecond in time. When the dialing control logic 307 supplies an enable signal over line 293 to the timing generator logic 301, the counter in logic 301 is enabled, allowing it to count in accordance with the two phase clock, signals received over lines 255, 257. Upon the occurrence of the first count, timing generator logic 301 generates a mute output signal on line 305 to terminal 12. Upon the occurrence of the second count, the leading edge of the first dial pulse is constructed by generation of a 10 cycle signal on line 297 to the dialing control logic 307. At an appropriate time, an inter-digit time signal on line 299 is supplied to dial control logic 307 by the timing generator 301. This inter-digit time signal is approximately 650 milliseconds in length.

The dialing control logic 307 responds to the 10 cycle signal on line 297 to provide digit out-pulsing on line 309 to terminal 17 of the dial pulse generator 243. The inter-digit time signal on line 299 is generated in response to the empty/full signal received from the dial pulse down counter 283 over line 285. In response to the signal on line 285, the dialing control logic 307 generates a signal on line 291 that is supplied to the dial pulse down counter 283 instructing the dial pulse down counter to accept another 4 bit digit from the circulating memory 273. The same signal is supplied to the timing generator logic 301 instructing the timing generator logic to supply the 650 millisecond signal over line 299 to the dialing control logic for the purpose of constructing the inter-digit time signal. As soon as the down counter 283 is set by another 4 bit digit, the restrict signal on line 295 is removed, thereby enabling the supplying of the 10 Hz signal on line 297 to control logic 307.

The reset signal on 275 generated by the timing generator logic 301 occurs in response to a signal on line 315 from a power-up circuit 311. Power-up circuit 311 detects a 0 or 1 condition at terminal 9 by way of line 313. More precisely, the power-up circuit detects the signal on line 313 going from a low to a high. Whenever power is being supplied to the dial pulse generator 243, the signal on line 313 is at a high level. Therefore, if a toll restrict function has occurred, in order to reset the dial pulse generator 243, power must be removed from the dial pulse generator. This is accomplished by opening the hookswitch on the subscriber unit.

The clock generator 253 receives input signals from a resistor and crystal, external to the dial pulse generator 243, over lines 267. The resistor and crystal are connected to terminals 13, 14 and 15. As a consequence of the resistor and crystal being connected to lines 267 of the clock generator 253, the clock generator is locked into a fairly stable 16 KHz frequency. This frequency is divided down to a 1000 HZ 2 phase, signal. Phase 1 of the clock on line 255 is about 115 microseconds in duration, while phase 2 on line 257 is about 800 microseconds in duration. The audio tone being supplied on line 303 to terminal 11 is for convenience, a 1 KHz signal.

The touch-pad to dial pulse converter of the present invention utilizes the functions of the dial pulse generator 243 (FIG. 5) in connection with the functions of the circuitry of FIG. 4. Line 105 is the tip line, and line 107 is the ring line for the subscriber unit of FIG. 2. These lines carry a loop current, depending on the loop length, that will vary from 23 milliamps (approximately 44 VDC) to 120 milliamps (approximately 100 VDC).

A bridge rectifier circuit comprised of a zener diode 131, a zener diode 135, and two standard diodes 133 and 137 are connected to the tip and ring lines 105 and 107. This circuit serves two functions. Its primary function is to insure that the polarity of the voltage applied to the touch-pad to dial pulse conversion unit is not varied, regardless of the changing polarities of the tip and ring leads. In addition, the zener diodes 131 and 135 have a breakdown rating of 100 volts in the reverse direction. This insures that voltages higher than 100 volts are not supplied to the conversion unit 15. These zener diodes thereby serve to suppress any transient voltage spikes appearing on the line.

The electronic out-pulsing switch of the conversion unit 15 basically consists of 3 transistors; 151, 149 and 139. Transistors 151 and 149 are connected in a standard Darlington configuration. Transistor 139 serves to turn on the transistor pair 151, 149. Thus whenever there is a voltage differential across the tip and ring lines 105, 107, resistor 145 will have a voltage dropped across it causing transistor 139 to turn on, thereby causing a current flow through resistor 147, that turns on transistor 149. Transistor 149 consequently turns transistor 151 on. Thus as soon as there is a voltage differential or current flow in the tip and ring loop, the out-pulsing switch consisting of transistors 151, 149 and 139 will close.

Once this out-pulsing switch is turned on, or closed, it may be turned off or opened in one of two ways. Transistor 141 will turn off the switch network when it is turned on. Or transistor 169 will turn off the switch network by way of transistor 141, when transistor 169 is turned on. Consider first the situation where transistor 141 is turned on by a signal from the dial pulse generator 243 at its output terminal 17. The output terminal 17 on the dial pulse generator as was seen, generates dial pulse signals which cause a current flow through resistor 187 causing transistor 141 to turn on and off in response thereto. As transistor 141 turns on, it shunts the current flowing through resistor 145 across transistor 139, thereby turning transistor 139 off. With transistor 139 off, transistors 149 and 151 consequently turn off. Every time a pulse from the dial pulse generator 243, at terminal 17 turns the transistor 141 on, the out-pulsing transistor switch network 149, 151, 139 will be turned off, or opened. In this manner, the dial pulse generator causes dialing pulses to be placed in the loop circuit of the telephone network. The alternate way of turning off the out-pulsing transistor switch combination 149, 151, 139 will be described hereinafter.

In order for the dial pulse generator 243 to operate, it must be supplied with a certain amount of voltage, approxiamtely in the range of 4 to 5 volts. As soon as transistor 151 is turned on, a current will flow from tip line 105 through zener diode 131 causing a pair of supply capacitors 155 and 157 to charge. The remaining path consists of inductance 159, diode 153, transistor 151 and diode 137, to ring line 107. This current path for charging capacitors 155 and 157 establishes the voltage that the dial pulse generator 243 will receive. The charge build up across capacitors 155 and 157 is limited by a zener diode 165 to aproximately 5.1 volts in order to protect the dial pulse generator 243, which is preferably an MOS integrated circuit device, from excessive voltage.

The inductor 159 provides a very high impedance to audio frequencies but a low impedance to DC current in order to prevent any audio shunting across the tip and ring lines. During out-pulsing, the transistor 151 will be turning on and off. During its off periods, the charge on the supply capacitors 155 and 157 will tend to be diminished as a consequence of a low resistance path through the network by way of lines 103 and 101. In order to prevent this discharge action, a diode 153 is placed in the discharge path, in series with the supply capacitors 155, 157, so that when the transistor 151 is off, current flow in the loop discharge path is prevented.

With these safeguards in place, the only devices that discharge the capacitors 155 and 157 are the dial pulse generator 243 and its associated circuitry consisting of transistors 169, 179 and 193. In order to insure that the capacitors 155 and 157 are sufficently charged in spite of the variation in loop length and consequently the current flowing therein, the parallel network of resistor 161 and zener diode 163 are utilized. When the loop is very long and there is a minimum of current flowing therein, in the range of 23 milliamps, the resistor 161 will insure that the voltage differential between the tip and ring lines is sufficient to charge the capacitors 155 and 157 sufficiently to drive the dial pulse generator 243. This resistance 161 is necessary because of the very low impedance of the telephone network. When the loop is very short and the current is in the range of 129 milliamps, the resistor 161 is not necessary to produce a sufficient voltage differential between the tip and ring lines. At this time, zener diode 163 which is in parallel with resistor 161 effectively shunts the resistor. Zener diode 163 has a breakdown voltage of approximately 3 ½ volts. Consequently, when there is a larger current flow in the loop, resistor 161 is shunted by the zener diode 163 thereby causing more current to flow to the network and less to the supply capacitors 155, 157.

In order to prevent hookswitch dialing at the subscriber unit, i.e., by taping of the hookswitch, a hookswitch inhibit circuit consisting of transistors 169, 179, 193 and 203, in addition to the parallel resistor capacitor network 197, 199, respectively, and the associated resistors and capacitors, as will be described hereinafter. The hookswitch inhibit circuit transistors 179 and 193 essentially form a flip-flop circuit.

Whenever the hookswitch is tapped, leads 93 and 95 are momentarily connected thereby placing a ground potential on line 95, since line 93 is at a ground. Placing a ground on line 95 causes the potential at terminal 9 of the dial pulse generator 243 to momentarily go to a binary 0 level relative to terminal 1 which is at a ground potential. The capacitor 199 in the path between terminal 9 and line 95 will start to charge as a result of the voltage being supplied by capacitors 155 and 157. As the capacitor 199 charges up, it allows the potential at terminal 9 to return to a logic 1 level. As will be remembered in connection with the description of FIG. 5, this low to high transition is detected by the power-up circuit 311, causing the dial pulse generator 243 to reset.

However, this does not occur because as soon as the voltage at terminal 9 goes low, the point of connection between resistor 185 and capacitor 191 also goes to a relative 0 binary level. This causes transistor 179 to turn off. As soon as transistor 179 turns off, transistor 193 turns on. As soon as transistor 193 turns on, the voltage at terminal 9 of the dial pulse generator 243 will be maintained at a binary 0 level regardless of the hookswitch position. With transistor 193 on, current will be flowing through resistor 183 and capacitor 191, through transistor 193 to ground, causing capacitor 191 to charge up. The RC time constant of the resistor capacitor network 183, 191 provides for approximately 400 milliseconds before capacitor 191 charges sufficiently to operate transistor 179, causing it to turn on. As soon as transistor 179 turns on, transistor 193 turns off. With transistor 193 off, the potential at terminal 9 of the dial pulse generator 243 goes back to its logic 1 level. This binary 0 to binary 1 level transition is detected and causes the dial pulse generator 243 to reset.

Resistor 197, connected in parallel with capacitor 199 serves to discharge the capacitor 199 when the contacts between lines 93 and 95 are open. Capacitors 177 and 195 provide the circuit with a certain amount of immunity to high frequency transients by preventing such transients from operating the flip-flop circuits inadvertently.

Upon the closing of the hookswitch contacts, causing the grounding of lead 95, thereby causing transistor switch 179 to turn off and transistor switch 193 to turn on, resistor 173 will build up sufficient voltage across it to operate transistor switch 169 and transistor switch 203 and maintain transistor switch 193 on. When transistor switch 169 turns on it will cause a current flow through resistor 167, causing transistor switch 141 to turn on. As was discussed above, whenever transistor switch 141 is on, the out-pulsing switch configuration made up of transistors 149, 151 and 139 is turned off. Transistor switch 169 will remain on for the entire millisecond period that transistor 193 is on and transistor 179 is off.

Transistor 203, when turned on, turns off transistor 209, which turns off transistor 213, causing the speaker in the subscriber unit (FIG. 2) to be muted, thereby preventing unpleasant popping sounds to occur in the speaker. These popping sounds are the result of hookswitch depressions. Muting also occurs during the time that pulses are being produced by the transistor switch network 151, 149, and 139 in response to signals from the dial pulse generator 243, as will be described hereinafter. The 400 millisecond time period during which the transistor switch network 151, 149 and 139 are held open, is sufficiently long to confuse any hookswitch dialing attempt, but still short enough to prevent disconnect at a PBX thereby allowing the flashing of a PBX operator by the hookswitch. Most PBX's today have a one second disconnect time constant.

Consider now the function of speaker muting at the subscriber unit as a result of out-pulsing. The mute circuit consists of 2 transistors; 209 and 213. The normal non-mute condition sees the dial pulse generator 243 supplying a binary high voltage level sufficient to keep transistor 209 on. Transistor 209, in turn, keeps transistor 213 on. Transistor 213 is in series with the speaker 45 (FIG. 2) in the subscriber unit. With transistor 213 on, the speaker output will not be muted.

During out-pulsing, as dictated by dial pulse generator 243, the signal at terminal 12 goes to a binary low voltage level which is a voltage level insufficient to keep transistor 209 on. This causes transistor 213 to turn off. With transistor 213 off, the sounds to speaker 45 (FIG. 2) will be muted. As noted above, the transistors 209 and 213 can also be operated by transistor 203. The capacitor 205 between the base and ground of transistor 209 causes transistor 209 to turn on very slowly once a binary high voltage level is restored to pin 12, or transistor 203 is turned off. It is desirable to have transistor 209 turn on slowly in order to prevent a pop in the speaker 45 of the subscriber unit (FIG. 2). Muting as controlled by the dial pulse generator 243 will occur approximately one millisecond before dialing begins and will end one millisecond after the last dial pulse has been generated.

A transistor 207 receives a 1000 Hz signal from the dial pulse generator 243 at its number 11 terminal. The transistor effectively amplifies this tone and applies it to line 97 which is connected to the speaker 45 of the telephone unit (FIG. 2). A resistor 212 in the collector circuit of the transistor 207 is selected to adjust the audio level to the speaker 45. During normal operation, the signal from terminal 11 of the dial pulse generated 243 is at a level insufficient to turn transistor 207 on. When a touch-pad button is depressed, the signal at terminal 11 goes high and then low at a frequency that causes a 1000 Hz signal to be applied to the speaker 45.

A crystal 201 and a resistor 211 connected to the dial pulse generator 243 provide the dial pulse generator 243 with a precise 16 KHz signal.

A plurality of switches 215 through 241 are connected to terminals 18 through 32 of the dial pulse generator 243. One side of all the switches are connected to ground. The other side of the switches are connected to their respective terminals on the dial pulse generator 243 terminals. Switches 237, 239, and 241, according to the combination of closures chosen determine the length of the number that can be dialed out. Switches 217 through 235 determine which of the 0 – 9 first digits are to be prohibited from being out-pulsed. The closure of switch 215 prohibits a second digit 0 from being out-pulsed. The touch-pad to dial pulse converter 15 receives the lines of cable 85 from the touch-pad keyboard 17 (FIG. 3). The lines 125, 115, 121, 129, 117, 127, 119 carry the 2 out of 7 code generated by the touch-pad keyboard 17. Line 123 is a ground wire. Line 103 eminates from the subscriber unit (FIG. 2).

What has been described is a touch-pad to dial pulse converter unit that is capable of receiving a touch-pad signal and converting it to dial pulses. The unit provides for toll restriction and prevents hookswitch dialing, all functions being powered off the current in the tip and ring loop to the subscriber unit without appreciably attenuating the signals supplied to the tip and ring circuit.

Obviously many modifications and variations of the present invention are possible in light of the above teachings. It is therefore, to be understood that within the scope of the appended claims, the invention may be practiced otherwise than as specifically described.

What is claimed is:

1. A touch-pad to dial-pulse conversion unit incorporable into a subscriber unit connected to a telephone line, said conversion unit receiving signals from a touch-pad switch, that replaces the pulse dialing mechanism of the subscriber unit, and converting them to dial pulses, said conversion unit comprising:
   means, responsive to digit indicating signals from said touch-pad switch for generating pulse indicating signals;
   means for buffering the flow of signals from said touch-pad switch to said pulse signal indicating means;
   transistor switch means responsive to the pulse indicating signals for generating the corresponding dial pulses on said telephone line; and
   a capacitor-inductor means connected across said telephone line on the subscriber unit side of said transistor switch means, said inductor means having a high impedance to audio frequencies and a low impedance to DC, said capacitor means receiving a portion of the loop current said telephone line and storing sufficient energy to power said pulse signal indicating means, said buffering means, and said transistor switch means.

2. The touch-pad to dial-pulse conversion unit of claim 1 further comprising means for regulating the current flow to said capacitor-inductor means.

3. The touch-pad to dial-pulse conversion unit of claim 2 wherein said current regulating means comprises a parallel resistance-zener diode network connected in series with said telephone line.

4. The touch-pad to dial-pulse conversion unit of claim 1, further comprising means responsive to said pulse indicating signals for applying a tone to said subscriber unit every time a touch-pad switch closure occurs.

5. The touch-pad to dial-pulse conversion unit of claim 1, further comprising means responsive to hookswitch operation of the subscriber unit for extending its break period sufficiently to confuse a hookswitch dialing attempt, without impairing flashback to a PBX console.

6. The touch-pad to dial-pulse conversion unit of claim 1, further comprising means responsive to a preset length code indicative of a certain number of digits for preventing said pulse signal indicating means from indicating pulse signals greater in number than indicated by said length code.

7. The touch-pad to dial-pulse conversion unit of claim 6, further comprising means for generating length codes, said means being programmable.

8. The touch-pad to dial-pulse conversion unit of claim 1, further comprising means responsive to a prohibited first digit code for preventing said pulse signal indicating means from indicating any further pulse signals upon detection of said prohibited first digit being generated by said pulse signal indicating means.

9. The touch-pad to dial-pulse conversion unit of claim 11, further comprising means for generating prohibited first digit codes, said means being programmable.

10. The touch-pad to dial-pulse conversion unit of claim 1, further comprising means responsive to a second digit zero code for preventing said pulse signal indicating means from indicating any further pulse signals upon detection of a zero digit being generated by said pulse signal indicating means after any first digit.

11. The touch-pad to dial-pulse conversion unit of claim 1, further comprising means for partially muting the sound of out-pulsing in said subscriber unit.

* * * * *